US012412281B2

(12) United States Patent
Lai et al.

(10) Patent No.: US 12,412,281 B2
(45) Date of Patent: Sep. 9, 2025

(54) METHOD AND SYSTEM FOR REMOTE SHARING THREE DIMENSIONAL SPACE ANNOTATION TRAJECTORY

(71) Applicant: Industrial Technology Research Institute, Hsinchu (TW)

(72) Inventors: Yueh-Yi Lai, Hsinchu County (TW); Yi-Heng Chou, Taoyuan (TW); Chia-Chung Chao, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 530 days.

(21) Appl. No.: 17/727,810

(22) Filed: Apr. 25, 2022

(65) Prior Publication Data

US 2023/0342945 A1 Oct. 26, 2023

(51) Int. Cl.
*G06T 7/00* (2017.01)
*G06F 3/04815* (2022.01)
*G06T 7/20* (2017.01)

(52) U.S. Cl.
CPC ............ *G06T 7/20* (2013.01); *G06F 3/04815* (2013.01); *G06T 2207/10028* (2013.01); *G06T 2207/30241* (2013.01)

(58) Field of Classification Search
CPC ............ G06T 7/20; G06T 2207/10028; G06T 2207/30241; G06F 3/04815; G06F 3/011
See application file for complete search history.

(56) References Cited

U.S. PATENT DOCUMENTS 9,898,090 B2   2/2018  Kim et al.
10,508,923 B2  12/2019 Asai
(Continued)

FOREIGN PATENT DOCUMENTS

CN   105824430   8/2016
CN   103135758   9/2016
(Continued)

OTHER PUBLICATIONS

Wikipedia, Trajectory (Year: 2024).*
(Continued)

*Primary Examiner* — Xiao Liu
(74) *Attorney, Agent, or Firm* — JCIPRNET

(57) ABSTRACT

A method and a system for remote sharing annotation trajectory in a three-dimensional space are provided. In response to activating a first electronic apparatus, the first electronic apparatus obtains a first reference point of a designated object presented in the first space. After the first space is displayed, the first electronic apparatus detects a three-dimensional movement trajectory of a target object in the first space, detects inflection point information of the three-dimensional movement trajectory and captures a diameter of the three-dimensional movement trajectory, and sends the inflection point information and the diameter to a second electronic apparatus. In response to activating the second electronic apparatus to display a second space, the second electronic apparatus reconstructs the three-dimensional movement trajectory based on the inflection point information and the diameter, and presents the three-dimensional movement trajectory in the second space based on a second reference point relative to the first reference point.

22 Claims, 4 Drawing Sheets

(56) References Cited

U.S. PATENT DOCUMENTS

| | | | | |
|---|---|---|---|---|
| 2013/0044115 | A1* | 2/2013 | Oyama | G05B 19/4068 |
| | | | | 345/473 |
| 2016/0133230 | A1* | 5/2016 | Daniels | G06F 3/147 |
| | | | | 345/633 |
| 2018/0144547 | A1* | 5/2018 | Shakib | G06T 15/503 |
| 2021/0209372 | A1 | 7/2021 | Tong et al. | |

FOREIGN PATENT DOCUMENTS

| | | |
|---|---|---|
| CN | 106066688 | 11/2016 |
| CN | 108920517 | 11/2018 |
| CN | 110865704 | 3/2020 |
| CN | 108572778 | 1/2021 |
| CN | 113160275 | 7/2021 |
| CN | 113412479 | 9/2021 |
| JP | H1074268 A * | 3/1998 |
| JP | 4097164 B2 * | 6/2008 |
| KR | 20120060548 | 6/2012 |
| KR | 102051309 | 12/2019 |
| TW | 201103001 | 1/2011 |
| TW | 201933153 | 8/2019 |
| TW | 202119154 | 5/2021 |

OTHER PUBLICATIONS

Okajima et al, An instruction method for displaying trajectory of an object in remote collaborative MR on the basis of changes in relative coordinates, Ninth Annual International Symposium on Applications and the Internet, pp. 43-49, (Year: 2009).*

Wikipedia, Interpolation (Year: 2024).*

"Office Action of Taiwan Counterpart Application", issued on Dec. 23, 2022, p. 1-p. 3.

"Office Action of China Counterpart Application", issued on May 20, 2025, p. 1-p. 7.

* cited by examiner

METHOD AND SYSTEM FOR REMOTE SHARING THREE DIMENSIONAL SPACE ANNOTATION TRAJECTORY

BACKGROUND

Technical Field

The disclosure relates to a remote transmission mechanism, and more particularly, relates to a method and a system for remote sharing trajectory annotation in a three-dimensional space.

Description of Related Art

With the advancement of technology, augmented reality (AR) and mixed reality (MR) are becoming more and more widely used. The technical principle of augmented reality is to capture a real scene by a camera, and in combination with a certain identification and positioning technology, the real scene on the screen is augmented with a computer-generated object, so that the user could see both the real world and the virtual world at the same time. Mixed reality refers to the combination of the real world and the virtual world to create new environments and visualizations, that is, the composite of virtual reality (VR) combined with augmented reality. Technology such as augmented reality and mixed reality could be further applied to remote operation guidance. For example, the process of operation on the local end could be presented on the remote end in real time. Therefore, how to improve the remote transmission is one of the current issues.

SUMMARY

The disclosure provides a method and a system for remote sharing annotation trajectory in a three-dimensional space, allowing real time sharing of trajectory annotation in a three-dimensional space.

A method for remote sharing annotation trajectory in a three-dimensional space of the disclosure includes: in response to activating a first electronic apparatus to display a first space, obtaining a first reference point of a designated object presented in the first space through the first electronic apparatus; detecting a three-dimensional movement trajectory of a target object in the first space through the first electronic apparatus after the first electronic apparatus displays the first space; detecting inflection point information of the three-dimensional movement trajectory and capturing a diameter of the three-dimensional movement trajectory through the first electronic apparatus; sending the inflection point information and the diameter to a second electronic apparatus through the first electronic apparatus; and in response to activating the second electronic apparatus to display a second space, reconstructing the three-dimensional movement trajectory through the second electronic apparatus based on the inflection point information and the diameter, and presenting the three-dimensional movement trajectory in the second space based on a second reference point relative to the first reference point.

A system for remote sharing annotation trajectory in a three-dimensional space of the disclosure includes: a first electronic apparatus and a second electronic apparatus, wherein the first electronic apparatus and the second electronic apparatus communicate with each other via a network. The first electronic apparatus is configured to: in response to activating a first electronic apparatus to display a first space, obtain a first reference point of a designated object presented in the first space; after the first electronic apparatus displays the first space, detect a three-dimensional movement trajectory of a target object in the first space; detect inflection point information of the three-dimensional movement trajectory and capture a diameter of the three-dimensional movement trajectory; and send the inflection point information and the diameter to the second electronic apparatus. The second electronic apparatus is configured to: in response to activating the second electronic apparatus to display the second space, reconstruct the three-dimensional movement trajectory based on the inflection point information and the diameter and present the three-dimensional movement trajectory in the second space based on a second reference point relative to the first reference point.

As described above, the disclosure sends the detected inflection point information and the diameter of the three-dimensional movement trajectory to the second electronic apparatus through the first electronic apparatus, whereby the size of the transmitted data can be reduced, thereby reducing the imaging delay problem of the second electronic apparatus to achieve the effect of real-time sharing.

DESCRIPTION OF THE EMBODIMENTS

Figure 1:
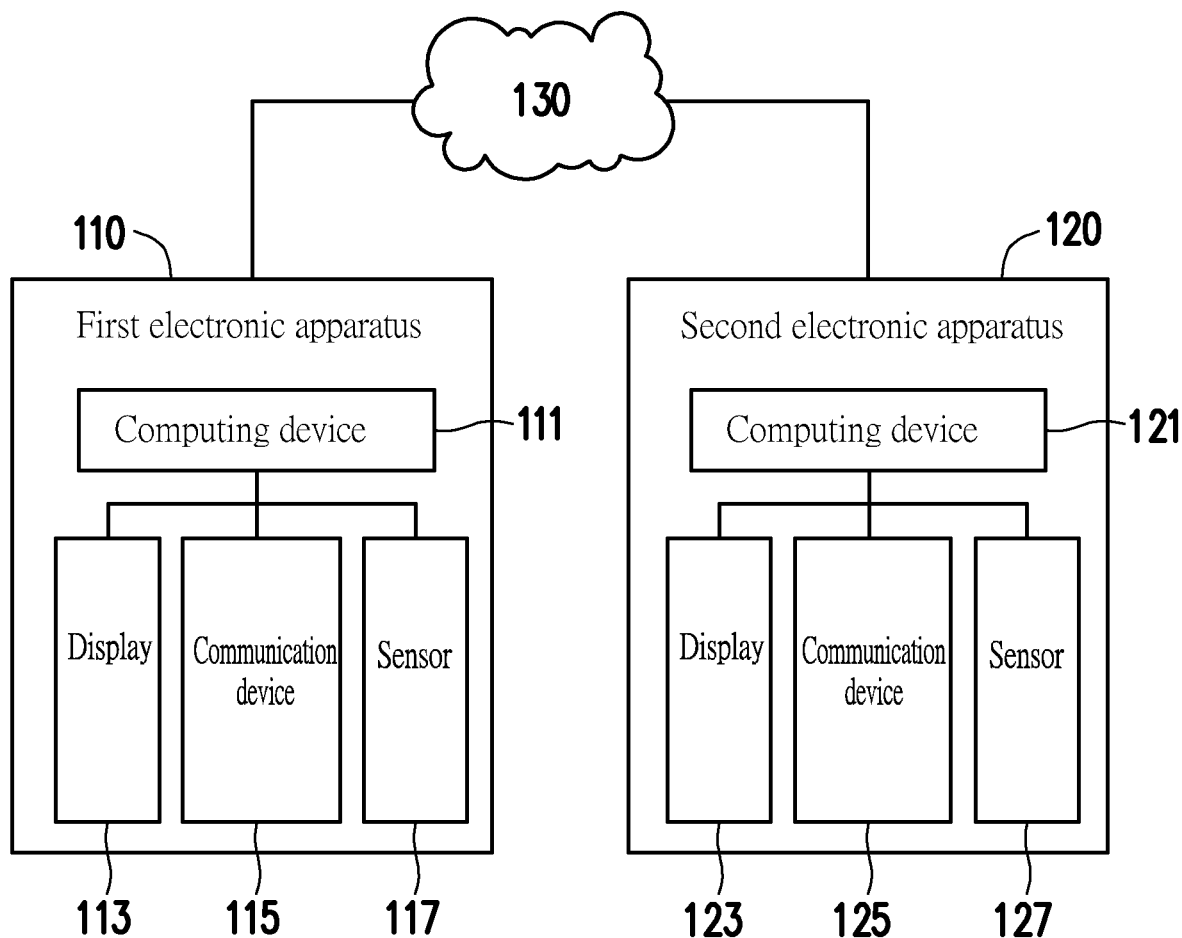
FIG. 1 is a block diagram of a system for remote sharing annotation trajectory in a three-dimensional space according to an embodiment of the disclosure.

FIG. 1 is a block diagram of a system for remote sharing annotation trajectory in a three-dimensional space according to an embodiment of the disclosure. Referring to FIG. 1, the system includes a first electronic apparatus 110 and a second electronic apparatus 120. The first electronic apparatus 110 and the second electronic apparatus 120 communicate with each other via a network 130. In an embodiment, the first electronic apparatus 110 is set on a local end, and the second electronic apparatus 120 is set on a remote end. In another embodiment, the first electronic apparatus 110 and the second electronic apparatus 120 may be set in the same place at the same time for use by different users.

The first electronic apparatus 110 and the second electronic apparatus 120 may be a head mounted display, a mixed reality (MR) glasses, or an augmented reality (AR) glasses. In addition, assuming that the first electronic apparatus 110 is used as an operation end, and the second electronic apparatus 120 is used as a receiving end, the first electronic apparatus 110 may be implemented by using a head mounted display, an MR glasses, or an AR glasses, and the second electronic apparatus 120 may be implemented by using an electronic apparatus with a display, such as a personal computer, a notebook computer, a tablet computer, a smart phone, and a smart television.

The first electronic apparatus 110 includes a computing device 111, a display 113, a communication device 115, and a sensor 117. The computing device 111 is coupled to the display 113, the communication device 115, and the sensor 117. The second electronic apparatus 120 includes a computing device 121, a display 123, a communication device 125, and a sensor 127. The computing device 121 is coupled to the display 123, the communication device 125, and the sensor 127.

The computing devices 111 and 112 respectively include processors and storages. The storages are used to store one or more code fragments for the corresponding processors to execute. The processor is, for example, a central processing unit (CPU), a physical processing unit (PPU), a programmable microprocessor, an embedded control chip, a digital signal processor (DSP), an application specific integrated circuits (ASIC), or other similar apparatuses.

The storage is, for example, any type of fixed or removable random access memory (RAM), read-only memory (ROM), flash memory, hard disk, other similar apparatuses, or a combination of the apparatuses.

The sensors 117 and 127 are, for example, image sensors, which are devices that convert optical images into electrical signals. Image sensors are mainly divided into charge coupled devices (CCDs) and complementary metal-oxide semiconductors (CMOSs).

The communication devices 115 and 125 may be chips or circuits using local area network (LAN) technology, wireless LAN (WLAN) technology, or mobile communication technology. A local area network is, for example, Ethernet. A wireless LAN is, for example, Wi-Fi. The mobile communication technology is, for example, global system for mobile communications (GSM), third-generation (3G) mobile communication technology, fourth-generation (4G) mobile communication technology, fifth-generation (5G) mobile communication technology, etc.

In another embodiment, the system may further set a cloud server, so that one of the first electronic apparatus 110 and the second electronic apparatus 120 uploads data/information to the cloud server, and the other downloads required data/information from the cloud server.

Figure 2:
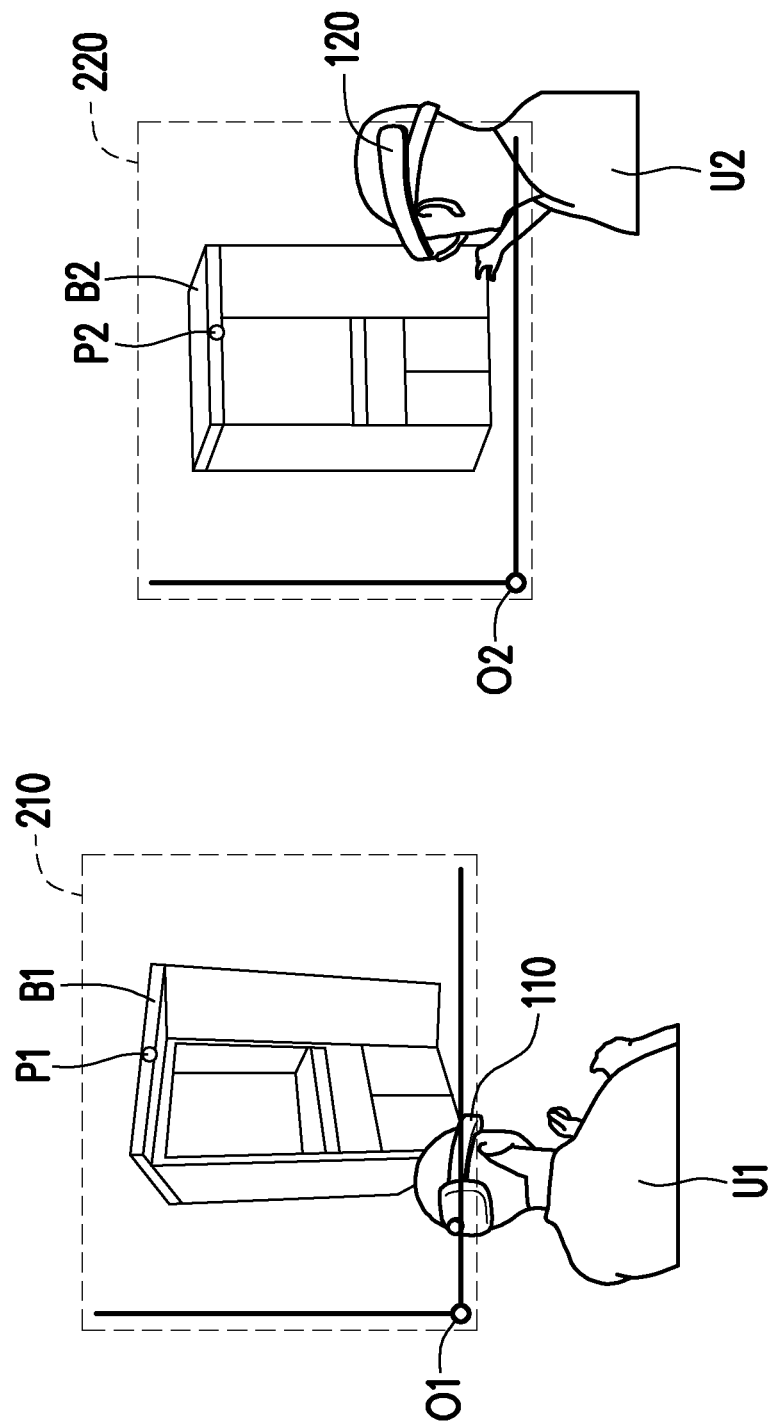
FIG. 2 is a schematic diagram of the system for remote sharing annotation trajectory in a three-dimensional space according to an embodiment of the disclosure.

FIG. 2 is a schematic diagram of the system for remote sharing annotation trajectory in a three-dimensional space according to an embodiment of the disclosure. In this embodiment, the first electronic apparatus 110 and the second electronic apparatus 120 are assumed to be head mounted mixed reality glasses. Furthermore, a user U1 is assumed to wear the first electronic apparatus 110 and a user U2 is assumed to wear the second electronic apparatus 120.

The display 113 of the first electronic apparatus 110 is used to display a first space 210 and present a designated object B1 in the first space 210. After activating the first electronic apparatus 110 to display the first space 210, the first electronic apparatus 110 generates a coordinate system (with origin coordinates O1) of the first space 210, and further obtains a first reference point P1 of the designated object B1, and sends the first reference point P1 to the second electronic apparatus 120.

The display 123 of the second electronic apparatus 120 is used to display a second space 220 and present a designated object B2 in the second space 220. After activating the second electronic apparatus 120 to display the second space 220, the second electronic apparatus 120 generates a coordinate system (with origin coordinates O2) of the second space 220. The second electronic apparatus 120 displays the designated object B2 corresponding to the designated object B1 in the second space 220 based on a second reference point P2 relative to the first reference point P1, so that the content presented in the second space 220 may correspond to the content presented in the first space 210.

In an embodiment, the designated object B1 displayed in the first space 210 is an image of a physical object (e.g., a machine) seen by the user U1. The designated object B2 displayed in the second space 220 is a virtual model previously established by the computing device 121 based on the physical object.

In another embodiment, the designated object B1 in the first space 210 is a virtual model previously established by the computing device 111 based on a physical object. The designated object B2 in the second space 220 is a virtual model previously established by the computing device 121 based on the physical object.

In yet another embodiment, the first electronic apparatus 110 and the second electronic apparatus 120 are set in different physical spaces. The designated object B1 observed in the first space 210 is an image of a physical object (e.g., a machine) seen by the user U1. The designated object B2 observed in the second space 220 is also an image of a physical object seen by the user U2, and both users U1 and U2 see a same type of the physical machine.

In an embodiment, the designated object B1 displayed in the first space 210 is a virtual model previously established by the computing device 111 based on a physical object (e.g., a machine). The designated object B2 displayed in the second space 220 is an image of a physical object (e.g., a machine) seen by the user U2.

The first electronic apparatus 110 may obtain a three-dimensional movement trajectory by detecting an operation of a target object by the user U1 through the sensor 117, and correspondingly present the three-dimensional movement trajectory in the second space 220 of the second electronic apparatus 120. Another embodiment is illustrated in the following.

Figure 3:
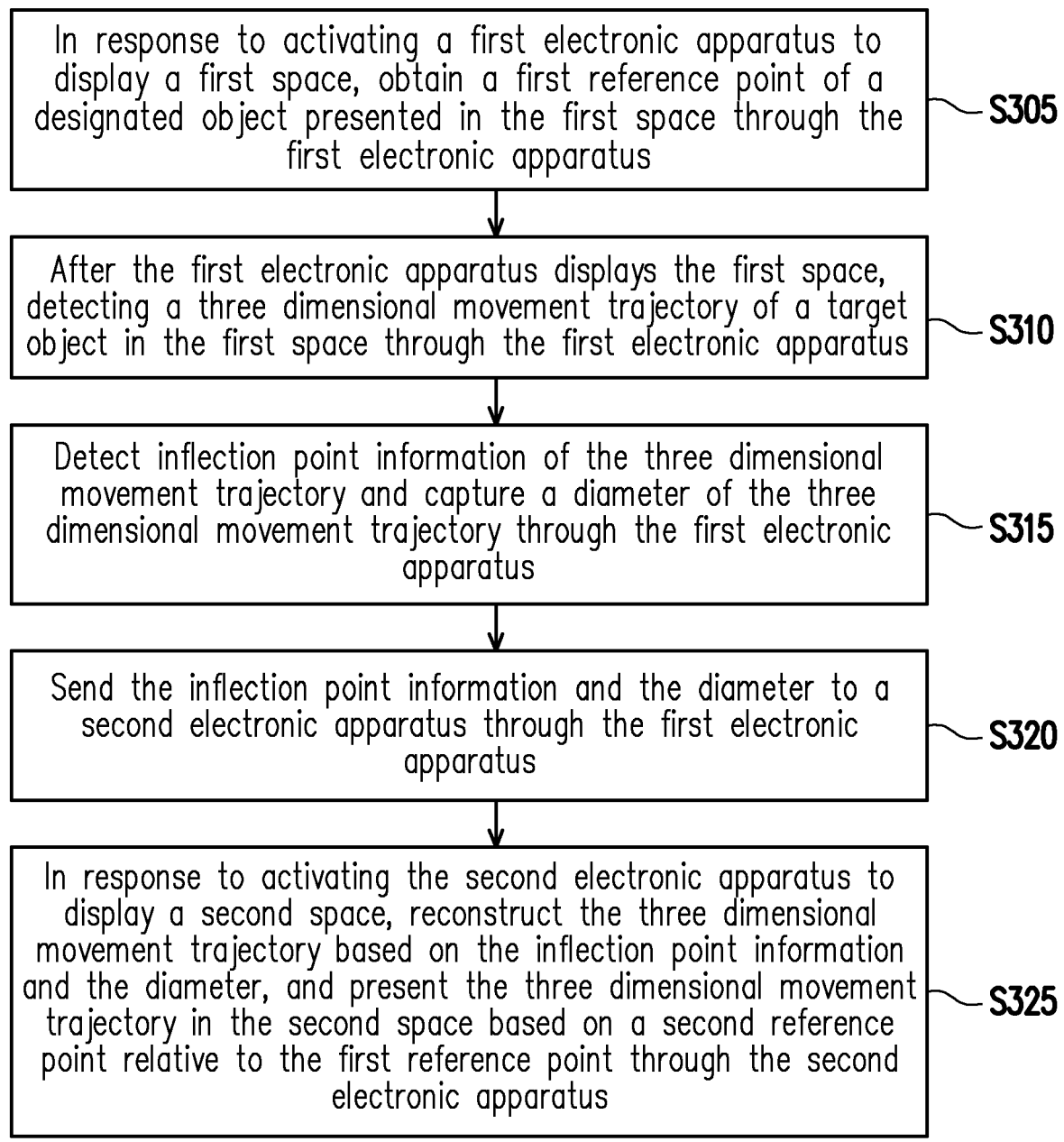
FIG. 3 is a flowchart of a method for remote sharing annotation trajectory in a three-dimensional space according to an embodiment of the disclosure.

FIG. 3 is a flowchart of a method for remote sharing annotation trajectory in a three-dimensional space according to an embodiment of the disclosure. Referring to FIG. 1 to FIG. 3, in Step S305, in response to activating the first electronic apparatus 110 to display the first space 210, the first reference point P1 of the designated object B1 presented in the first space 210 is obtained by the first electronic apparatus 110. When the first electronic apparatus 110 is activated to display the first space 210, a coordinate system is generated. For example, the corresponding coordinate system is generated based on the origin coordinates O1. Next, a movement of a target object in the coordinate system is sensed through the sensor 117 to collect data. Here, the target object is, for example, a hand of the user U1. The first space 210 is, for example, a space corresponding to a mixed reality scene displayed by the first electronic apparatus 110.

Next, in Step S310, after the first electronic apparatus 110 displays the first space 210, the first electronic apparatus 110 detects the three-dimensional movement trajectory of the target object in the first space 210. That is, the operation of the hand of the user U1 is detected through the sensor 117 to obtain the three-dimensional movement trajectory.

Next, in Step S315, inflection point information of the three-dimensional movement trajectory is detected through the first electronic apparatus 110, and a diameter of the three-dimensional movement trajectory is captured. For example, after the sensor 117 detects the three-dimensional movement trajectory, the computing device 111 may obtain the diameter and the inflection point information from the three-dimensional movement trajectory. For example, the computing device 111 may provide input options for the user U1 to select parameters such as the thickness (diameter) and color of the trajectory, or generate the three-dimensional movement trajectory using default parameters such as the thickness (diameter) and color of the trajectory. Coordinate information determined to be an inflection point is recorded in the inflection point information.

In this embodiment, the computing device 111 first extracts multiple sampling points from the three-dimensional movement trajectory, and forms two connecting lines according to each sampling point and two adjacent sampling points before and after the sampling point. An included angle is generated from the two connecting lines. In response to the included angle being smaller than a predetermined value, the computing device 111 determines that the sampling point is the inflection point, and records the coordinates of the inflection point to the inflection point information.

Figure 4:
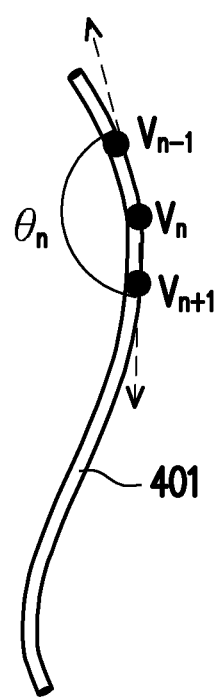
FIG. 4 is a schematic diagram of a three-dimensional movement trajectory according to an embodiment of the disclosure.

FIG. 4 is a schematic diagram of a three-dimensional movement trajectory according to an embodiment of the disclosure. Referring to FIG. 4, which shows a part of a three-dimensional movement trajectory 401 and is illustrated by a sampling point $V_n$. Adjacent sampling points $V_{n-1}$ and $V_{n+1}$ before and after the sampling point $V_n$ are taken to calculate an included angle $\theta_n$ corresponding to the sampling point $V_n$. That is, a first connecting line is formed based on the sampling point $V_n$ and the sampling point $V_{n-1}$, and a second connecting line is formed based on the sampling point $V_n$ and the sampling point $V_{n+1}$. Also, the included angle $\theta_n$ is generated from the first connecting line and the second connecting line. For example, the included angle $\theta_n$ may be obtained by the following equation:

$$\cos \theta_n = \frac{\overrightarrow{V_n V_{n-1}} \cdot \overrightarrow{V_n V_{n+1}}}{|\overrightarrow{V_n V_{n-1}}| \cdot |\overrightarrow{V_n V_{n+1}}|}.$$

$\overrightarrow{V_n V_{n-1}}$ represents a vector formed by the sampling point $V_n$ and the sampling point $V_{n-1}$, and $\overrightarrow{V_n V_{n+1}}$ represents a vector formed by the sampling point $V_n$ and the sampling point $V_{n+1}$. Next, the computing device 111 determines whether the included angle $\theta_n$ is smaller than a predetermined value (for example, the predetermined value is 180°, 170°, etc.). In response to the included angle $\theta_n$ being smaller than the predetermined value, the computing device 111 determines that the sampling point $V_n$ is the inflection point, and records the coordinates of the inflection point to the inflection point information. Only points that are determined to be the inflection points are recorded in the inflection point information. If the included angle $\theta_n$ is not smaller than the predetermined value, the computing device 111 determines that the sampling point $V_n$ is not an inflection point.

In addition, the computing device 111 further records intersection coordinates of tangent lines of every two adjacent inflection points as a middle point to be recorded to the inflection point information. That is, the middle point is calculated for each inflection point and a next inflection point thereof in the recorded inflection point information. For an inflection point $P_m$ and an inflection point $P_{m+1}$, the tangent lines of the inflection point $P_m$ and the inflection point $P_{m+1}$ are calculated, and then the intersection coordinates of intersection of the two tangent lines are calculated and recorded to the inflection point information as a middle point $P_{m+0.5}$ between the inflection point $P_m$ and the inflection point $P_{m+1}$.

Next, in Step S320, the inflection point information and the diameter are sent to the second electronic apparatus 120 through the first electronic apparatus 110. Furthermore, in Step S325, in response to activating the second electronic apparatus 120 to display the second space 220, the second electronic apparatus 120 reconstructs the three-dimensional movement trajectory based on the inflection point information and the diameter, and presents the three-dimensional movement trajectory in the second space 220 based on the second reference point P2 relative to the first reference point P1.

In an embodiment, the first electronic apparatus 110 may obtain encoded information by encoding the inflection point information and the diameter through the computing device 111 prior to transmission, and send the encoded information to the second electronic apparatus 120. In another embodiment, the first electronic apparatus 110 may send the encoded information to the cloud server, so that the second electronic apparatus 120 may download the encoded information from the cloud server.

After the second electronic apparatus 120 obtains the encoded information, the computing device 121 decodes the encoded information to obtain the inflection point information and the diameter. Next, the computing device 121 determines whether a number of inflection points in the inflection point information is greater than a threshold value (for example, 2). In response to the number of inflection points being greater than the threshold value, the computing device 121 determines that the three-dimensional movement trajectory is a curve, substitutes all the inflection points in the inflection point information and the middle points between two inflection points into a curve generator (e.g., Bezier curve generator) to reconstruct the curve, and reconstruct the three-dimensional movement trajectory in combination with the diameter. In addition, in response to the number of inflection points not being greater than the threshold value, the computing device 121 determines that the three-dimensional movement trajectory is a straight line, and reconstructs the three-dimensional movement trajectory (straight-line trajectory) in combination with the diameter.

The first electronic apparatus 110 and the second electronic apparatus 120 have the following four usage scenarios. The first scenario is that an image of a physical object is displayed in the first electronic apparatus 110, that is, the physical object is seen by the user U1 through the first electronic apparatus 110, and a virtual model corresponding to the physical object is displayed in the second electronic apparatus 120. The second scenario is that a first virtual model is displayed in the first electronic apparatus 110, and a second virtual model corresponding to the first virtual model is displayed in the second electronic apparatus 120. The third scenario is that the first electronic apparatus 110 and the second electronic apparatus 120 are in different physical spaces, the user U1 sees the physical object through the first electronic apparatus 110, and the user U2 sees the physical object through the second electronic apparatus 120. The fourth scenario is an opposite variation of the first scenario. The image of the physical object is displayed in the second electronic apparatus 120, that is, the physical object is seen by the user U2 through the second electronic apparatus 120, and the virtual model corresponding to the physical object is displayed in the first electronic apparatus 110. In the first, third, and fourth scenarios, there is at least one identifying mark on the physical object as a reference point. The above Steps S305 to S325 are respectively applicable to the four scenarios, and the specific descriptions are as follows.

In the first scenario, the designated object B1 corresponds to a presentation of the physical object in the first space 210, and the physical object has an identifying mark thereon. In response to activating the first electronic apparatus 110 to display the first space 210, the physical object is seen by the user through the first electronic apparatus 110, and the first electronic apparatus 110 captures the physical object through the sensor 117 thereof and records a spatial address of the corresponding designated object B1 in the display 113. The first electronic apparatus 110 activates origin space detection, and uses the currently detected space as the first space 210. At this time, the computing device 111 obtains the first reference point P1 of the designated object B1 presented in the first space 210 based on the identifying mark. The first electronic apparatus 110 also sends the first reference point P1 to the second electronic apparatus 120. The second reference point P2 relative to the first reference point P1 is located in the second space 220 through the computing device 121 of the second electronic apparatus 120, and the virtual model (designated object B2) corresponding to the designated object B1 is displayed in the second space 220 based on the second reference point P2.

In the first scenario, the user U1 detects the three-dimensional movement trajectory of the target object (the hand of the user U1) in the first space 210 through the first electronic apparatus 110, and sends the inflection point information and the diameter to the second electronic apparatus 120 based on the three-dimensional movement trajectory. After the second electronic apparatus 120 reconstructs the three-dimensional movement trajectory, the computing device 121 presents the three-dimensional movement trajectory corresponding to the virtual model (designated object B2) in the second space 220.

On the other hand, in the first scenario, the user U2 may also detect a three-dimensional movement trajectory of another target object (a hand of the user U2) in the second space 220 through the second electronic apparatus 120, and detect inflection point information of the three-dimensional movement trajectory through the computing device 121. After capturing a diameter of the three-dimensional movement trajectory, the obtained inflection point information and diameter are sent to the first electronic apparatus 110, so that the first electronic apparatus 110 may reconstruct the three-dimensional movement trajectory (which is detected by the second electronic apparatus 120) based on the received inflection point information and diameter. After the first electronic apparatus 110 reconstructs the three-dimensional movement trajectory, the computing device 111 presents the three-dimensional movement trajectory corresponding to the designated object B1 in the first space 210.

The user U1 sends the inflection point information and the diameter to the second electronic apparatus 120 by the first electronic apparatus 110 in the first space 210, and after reconstructing the three-dimensional movement trajectory, the computing device 121 presents the three-dimensional movement trajectory of the corresponding virtual model (designated object B2) in the second space 220. Similarly, after the user U2 sends the inflection point information and the diameter to the first electronic apparatus 110 by the second electronic apparatus 120 in the second space 220, and after reconstructing the three-dimensional movement trajectory, the computing device 111 presents the corresponding (designated object B1) three-dimensional movement trajectory in the first space 210.

In addition, in the first scenario, after presenting the corresponding virtual model (designated object B2) in the second space 220, in response to the movement of the virtual model in the second space 220, the computing device 121 obtains coordinate offset information of the virtual model, and presents the three-dimensional movement trajectory of the corresponding virtual model in the second space 220 based on the coordinate offset information.

In the second scenario, the designated object B1 is the first virtual model loaded into the first space 210, and a position of the first reference point P1 is predefined in the first virtual model. The designated object B2 is the second virtual model loaded into the second space 220, and a position of the second reference point P2 corresponding to the first reference point P1 is predefined in the second virtual model. In response to activating the first electronic apparatus 110 to display the first space 210, the first virtual model is loaded in the first space 210 through the computing device 111, and the presented first reference point is obtained. In response to activating the second electronic apparatus 120 to display the second space 220, the computing device 121 loads the second virtual model relative to the first virtual model in the second space 220. In response to the movement of the first virtual model in the first space 210, the computing device 111 obtains first coordinate offset information of the first virtual model and sends the first coordinate offset information to the second electronic apparatus 120, so that the computing device 121 of the second electronic apparatus 120 may present the three-dimensional movement trajectory corresponding to the second virtual model in the second space 220 based on the first coordinate offset information. In response to the movement of the second virtual model in the second space 220, the computing device 121 of the second electronic apparatus 120 obtains second coordinate offset information of the second virtual model, and presents the three-dimensional movement trajectory corresponding to the first virtual model in the second space 220 based on the second coordinate offset information.

In other words, in the second scenario, after defining the first space 210 and the second space 220 corresponding to the first electronic apparatus 110 and the second electronic apparatus 120, in the case that the first virtual model of the first space 210 does not move, the first electronic apparatus 110 only needs to record information of the three-dimensional movement trajectory without recording a coordinate linkage related to the first virtual model. If the first virtual model of the first space 210 moves, both the information of the three-dimensional movement trajectory and the first coordinate offset information need to be sent to the second electronic apparatus 120, so that the second virtual model presented in the second space 220 of the second electronic apparatus 120 moves correspondingly.

In the third scenario, in the current spaces where the user U1 and the user U2 are located, a spatial location of a visual physical object is obtained through the first electronic apparatus 110 and the second electronic apparatus 120. In this embodiment, the first space 210 and the second space 220 are different physical spaces. The first electronic apparatus 110 activates origin space detection, and takes the currently detected space as the first space 210. In response to activating the first electronic apparatus 110 to display the first space 210, the computing device 111 of the first electronic apparatus 110 obtains the first reference point P1 of the designated object B1 presented in the first space 210 based on the identifying mark. In addition, the second electronic apparatus 120 activates origin space detection, and takes the currently detected space as the second space 220. In response to activating the second electronic apparatus 120 to display the second space 220, the computing device 121 of the second electronic apparatus 120 obtains the second reference point P2 of the designated object B2 presented in the second space 220 based on the identifying mark.

In fourth scenario, the image of the physical object is displayed in the second electronic apparatus 120, that is, the physical object is seen by the user through the second electronic apparatus 120, and the virtual model corresponding to the physical object is displayed in the first electronic apparatus 110. The second electronic apparatus 120 activates origin space detection, and takes the currently detected space as the second space 220. After the user U1 sends the inflection point information and the diameter relative to the first reference point P1 to the second electronic apparatus 120 by the first electronic apparatus 110 in the first space 210, and after reconstructing the three-dimensional movement trajectory, the computing device 121 presents the three-dimensional movement trajectory relative to the second reference point P2 in the second space 220. After the user U2 sends the inflection point information and the diameter relative to the second reference point P2 to the first electronic apparatus 110 by the second electronic apparatus 120 in the second space 220, and after reconstructing the three-dimensional movement trajectory, the computing device 111 presents the three-dimensional movement trajectory relative to the first reference point P1 in the first space 210.

In summary, through the disclosure, the inflection point information and the diameter of the three-dimensional movement trajectory detected by the electronic apparatus (e.g., the first electronic apparatus) on the operation end could be sent to the electronic apparatus (e.g., the second electronic apparatus) on the receiving end. Therefore, only the inflection point information and the diameter are sent instead of the complete data, which could significantly reduce the amount of data sent.

In terms of recording the complete amount of data, the recording format is: 3-dimensional coordinates (x, y, z) of each point, with a total of 156 points that needs to be recorded; normal vector information of each point; information of each surface, with a total of 144 surfaces; and color information, i.e., RGB, with a total of 3 bits. The file size is 18.1 Kbytes. For 4G network transmission, the transmission time is 1.8 ms. In terms of the manner of the disclosure, the recording format is: 3-dimensional coordinates (x, y, z) of the inflection point, with a total of 3 points; diameter, with a total of 1 integer value; and color information, i.e., RGB, with a total of 3 bits. The file size is 49 bytes. For 4G network transmission, the transmission time is 0.005 ms.

Since the amount of data sent is reduced, the transmission speed could be accelerated to solve the imaging delay problem of the remote electronic apparatus. In addition, in the case that the designated object presented in the two electronic apparatuses does not move, the three-dimensional movement trajectory could be displayed without any coordinate transformation to achieve the effect of real-time sharing.

What is claimed is:

1. A method for remote sharing annotation trajectory in a three-dimensional space, comprising:
   in response to activating a first electronic apparatus set on a local end to display a first space, performing following steps by the first electronic apparatus, including:
      generating a first coordinate system of a first space, and displaying a designated object presented in the first space, wherein the designated object corresponds to a physical object, and the physical object has an identifying mark thereon;
      obtaining a coordinate position of a first reference point corresponding to the identifying mark in the first coordinate system;
      detecting a three-dimensional movement trajectory of a target object in the first space;
      selecting a plurality of inflection points from a plurality of sampling points included in the three-dimensional moving trajectory, recording coordinates of the inflection points to inflection point information, and capturing a line thickness of the three-dimensional movement trajectory, wherein a number of inflection points is less than a number of sampling points; and
      sending a coordinate position of the first reference point, the inflection point information and the line thickness to a second electronic apparatus set on a remote end; and
   in response to activating the second electronic apparatus to display a second space, performing following steps by the second electronic apparatus, including:
      generating a second coordinate system of the second space, and locating a second reference point relative to the first reference point in the second space;
      correspondingly generating a line based on the coordinates of the inflection points recorded in the inflection point information, reconstructing the three-dimensional movement trajectory using a 3D rendering manner based on the line and the line thickness; and
      presenting the three-dimensional movement trajectory in the second space relative to the second reference point.

2. The method for remote sharing annotation trajectory in a three-dimensional space according to claim 1, wherein in the steps performed by the first electronic apparatus, the step of selecting a plurality of inflection points from a plurality of sampling points included in the three-dimensional moving trajectory comprises:
   extracting the plurality of sampling points from the three-dimensional movement trajectory, and generating an included angle according to a first connecting line formed by an $n^{th}$ sampling point and an $(n-1)^{th}$ sampling point and a second connecting line formed by the $n^{th}$ sampling point and an $(n+1)^{th}$ sampling point;
   determining whether the included angle is smaller than a predetermined value; and
   in response to the included angle being smaller than the predetermined value, determining the $n^{th}$ sampling point to be one of the inflection points, and recording coordinates of one of the inflection points to the inflection point information.

3. The method for remote sharing annotation trajectory in a three-dimensional space according to claim 2, wherein in the steps performed by the first electronic apparatus, the step of recording the coordinates of the inflection points to the inflection point information further comprises:
   recording intersection coordinates of tangent lines of every two adjacent inflection points to the inflection point information as a middle point.

4. The method for remote sharing annotation trajectory in a three-dimensional space according to claim 1, wherein after sending the coordinate position of the first reference point, the inflection point information and the line thickness to the second electronic apparatus, the steps performed by the second electronic apparatus further comprises:
   determining whether the number of inflection points in the inflection point information is greater than a threshold value-through the second electronic apparatus;

in response to the number of inflection points being greater than the threshold value, determining the three-dimensional movement trajectory to be a curve; and in response to the number of inflection points not being greater than the threshold value, determining the three-dimensional movement trajectory to be a straight line.

5. The method for remote sharing annotation trajectory in a three-dimensional space according to claim 1, wherein in the steps performed by the first electronic apparatus, the step of sending the coordinate position of the first reference point, the inflection point information and the line thickness to the second electronic apparatus comprises:

encoding the inflection point information and the line thickness to obtain encoded information; and sending the encoded information to a cloud server through the first electronic apparatus, wherein after sending the encoded information to the cloud server through the first electronic apparatus, the method further comprises:

downloading the encoded information from the cloud server through the second electronic apparatus, and decoding the encoded information to obtain the inflection point information and the line thickness.

6. The method for remote sharing annotation trajectory in a three-dimensional space according to claim 1, wherein the designated object corresponds to the physical object presented in the first space, wherein in response to activating the first electronic apparatus to display the first space, the method further comprises:

obtaining the first reference point of the designated object presented in the first space based on the identifying mark through the first electronic apparatus, wherein in response to activating the second electronic apparatus to display the second space, the method further comprises:

after locating the second reference point relative to the first reference point in the second space through the second electronic apparatus, displaying a virtual model corresponding to the designated object in the second space based on the second reference point through the second electronic apparatus; and after reconstructing the three-dimensional movement trajectory, presenting the three-dimensional movement trajectory corresponding to the virtual model in the second space through the second electronic apparatus.

7. The method for remote sharing annotation trajectory in a three-dimensional space according to claim 6, wherein after displaying the virtual model corresponding to the designated object in the second space based on the second reference point through the second electronic apparatus, the method further comprises:

in response to a movement of the virtual model in the second space, obtaining coordinate offset information of the virtual model through the second electronic apparatus; and presenting the three-dimensional movement trajectory corresponding to the virtual model in the second space based on the coordinate offset information through the second electronic apparatus.

8. The method for remote sharing annotation trajectory in a three-dimensional space according to claim 1, wherein the designated object is a virtual model corresponding to the physical object presented in the second space, wherein the method further comprises:

sending the coordinate position of the first reference point, the inflection point information and the line thickness to the second electronic apparatus through the first electronic apparatus, so that the second electronic apparatus presents the three-dimensional movement trajectory relative to the second reference point in the second space after reconstructing the three-dimensional movement trajectory;

sending inflection point information and a line thickness relative to the second reference point to the first electronic apparatus through the second electronic apparatus, so that the first electronic apparatus presents the three-dimensional movement trajectory relative to the first reference point in the first space after reconstructing the three-dimensional movement trajectory.

9. The method for remote sharing annotation trajectory in a three-dimensional space according to claim 1, wherein the designated object is a first virtual model loaded into the first space, and the first virtual model comprises the first reference point, wherein in response to activating the second electronic apparatus to display the second space, the method further comprises:

loading a second virtual model relative to the first virtual model in the second space through the second electronic apparatus, wherein the second virtual model comprises the second reference point.

10. The method for remote sharing annotation trajectory in a three-dimensional space according to claim 9, wherein in response to a movement of the first virtual model in the first space, the method comprises obtaining first coordinate offset information of the first virtual model and sending the first coordinate offset information to the second electronic apparatus through the first electronic apparatus; and presenting the three-dimensional movement trajectory corresponding to the second virtual model in the second space based on the first coordinate offset information through the second electronic apparatus, wherein in response to a movement of the second virtual model in the second space, the method comprises:

obtaining second coordinate offset information of the second virtual model through the second electronic apparatus, and presenting the three-dimensional movement trajectory corresponding to the first virtual model in the second space based on the second coordinate offset information through the second electronic apparatus.

11. The method for remote sharing annotation trajectory in a three-dimensional space according to claim 1, wherein in response to activating the second electronic apparatus to display the second space, the method further comprises:

obtaining the second reference point of the designated object presented in the second space based on the identifying mark through the second electronic apparatus, and after reconstructing the three-dimensional movement trajectory, presenting the three-dimensional movement trajectory corresponding to the reference point in the second space.

12. A system for remote sharing annotation trajectory in a three-dimensional space, comprising:

a first electronic apparatus set on a local end and a second electronic apparatus set on a remote end, wherein the first electronic apparatus and the second electronic apparatus communicate with each other via a network;

the first electronic apparatus is configured to: in response to activating the first electronic apparatus to display a first space, generate a first coordinate system of a first space, and display a designated object presented in the first space, wherein the designated object corresponds to a physical object, and the physical object has an identifying mark thereon; obtain a coordinate position of a first reference point corresponding to the identifying mark in the first coordinate system detect a three-dimensional movement trajectory of a target object in the first space; select a plurality of inflection points from a plurality of sampling points included in the three-dimensional moving trajectory, record coordinates of the inflection points to inflection point information and capture a line thickness of the three-dimensional movement trajectory, wherein a number of inflection points is less than a number of sampling points; and send a coordinate position of the first reference point, the inflection point information and the line thickness to the second electronic apparatus;

the second electronic apparatus is configured to: in response to activating the second electronic apparatus to display a second space, generate a second coordinate system of the second space, and locate a second reference point relative to the first reference point in the second space; correspondingly generate a line based on the coordinates of the inflection points recorded in the inflection point information, reconstruct the three-dimensional movement trajectory using a 3D rendering manner based on the line and the line thickness, and present the three-dimensional movement trajectory in the second space relative to the second reference point.

13. The system for remote sharing annotation trajectory in a three-dimensional space according to claim 12, wherein the first electronic apparatus is configured to:

extract the plurality of sampling points from the three-dimensional movement trajectory, and generate an included angle according to a first connecting line formed by an $n^{th}$ sampling point and an $(n-1)^{th}$ sampling point and a second connecting line formed by the $n^{th}$ sampling point and an $(n+1)^{th}$ sampling point;

determine whether the included angle is smaller than a predetermined value; and in response to the included angle being smaller than the predetermined value, determine the $n^{th}$ sampling point to be one of the inflection points, and record coordinates of one of the inflection points to the inflection point information.

14. The system for remote sharing annotation trajectory in a three-dimensional space according to claim 13, wherein the first electronic apparatus is configured to:

record intersection coordinates of tangent lines of every two adjacent inflection points to the inflection point information as a middle point.

15. The system for remote sharing annotation trajectory in a three-dimensional space according to claim 12, wherein the second electronic apparatus is configured to:

determine whether the number of inflection points in the inflection point information is greater than a threshold value;

in response to the number of inflection points being greater than the threshold value, determine the three-dimensional movement trajectory to be a curve; and in response to the number of inflection points being smaller than the threshold value, determine the three-dimensional movement trajectory to be a straight line.

16. The system for remote sharing annotation trajectory in a three-dimensional space according to claim 12, further comprising: a cloud server, wherein the first electronic apparatus is configured to: encode the inflection point information and the line thickness to obtain encoded information, and send the encoded information to the cloud server, the second electronic apparatus is configured to: download the encoded information from the cloud server, and decode the encoded information to obtain the inflection point information and the line thickness.

17. The system for remote sharing annotation trajectory in a three-dimensional space according to claim 12, wherein the first electronic apparatus and the second electronic apparatus are respectively a head mounted display, a mixed reality glasses, or an augmented reality glasses, the first electronic apparatus comprises:

a first display;

a first communication device;

a first sensor, configured to detect the three-dimensional movement trajectory of the target object;

a first computing device, coupled to the first display, the first communication device, and the first sensor, and configured to: in response to activating the first electronic apparatus to display the first space in the first display, generate the first coordinate system of the first space, and display the designated object presented in the first space; obtain the coordinate position of the first reference point corresponding to the identifying mark in the first coordinate system the three-dimensional movement trajectory of the target object in the first space; select the plurality of inflection points from the plurality of sampling points included in the three-dimensional moving trajectory, record the coordinates of the inflection points to the inflection point information and capture the line thickness of the three-dimensional movement trajectory, and send the coordinate position of the first reference point, the inflection point information and the line thickness to the second electronic apparatus through the first communication device, wherein the second electronic apparatus comprises:

a second communication device, establishing a connection with the first communication device via the network;

a second display; and a second computing device, coupled to the second communication device and the second display, and configured to: in response to activating the second electronic apparatus to display the second space in the second display, generate the second coordinate system of the second space, and locate the second reference point relative to the first reference point in the second space; correspondingly generate a line based on the coordinates of the inflection points recorded in the inflection point information, reconstruct the three-dimensional movement trajectory based on the inflection point information and the line thickness, and present the three-dimensional movement trajectory in the second space based on the second reference point relative to the first reference point.

18. The system for remote sharing annotation trajectory in a three-dimensional space according to claim 12, wherein the designated object corresponds to the physical object presented in the first space, wherein in response to activating the first electronic apparatus to display the first space, the first electronic apparatus is further configured to: obtain the first reference point of the designated object presented in the first space based on the identifying mark, wherein in response to activating the second electronic apparatus to display the second space, the second electronic apparatus is further configured to: after locating the second reference point relative to the first reference point in the second space, display a virtual model corresponding to the designated object in the second space based on the second reference point; and after reconstructing the three-dimensional movement trajectory, present the three-dimensional movement trajectory corresponding to the virtual model in the second space.

19. The system for remote sharing annotation trajectory in a three-dimensional space according to claim 18, wherein in response to a movement of the virtual model in the second space, the second electronic apparatus is further configured to:

obtain coordinate offset information of the virtual model; and present the three-dimensional movement trajectory corresponding to the virtual model in the second space based on the coordinate offset information.

20. The system for remote sharing annotation trajectory in a three-dimensional space according to claim 12, wherein the designated object is a virtual model corresponding to the physical object presented in the second space, the first electronic apparatus is configured to: send the coordinate position of the first reference point, the inflection point information and the line thickness to the second electronic apparatus, so that the second electronic apparatus presents the three-dimensional movement trajectory relative to the second reference point in the second space after reconstructing the three-dimensional movement trajectory;

the second electronic apparatus is configured to: send inflection point information and a line thickness relative to the second reference point to the first electronic apparatus, so that the first electronic apparatus presents the three-dimensional movement trajectory relative to the first reference point in the first space after reconstructing the three-dimensional movement trajectory.

21. The system for remote sharing annotation trajectory in a three-dimensional space according to claim 12, wherein the designated object is a first virtual model loaded into the first space, and the first virtual model comprises the first reference point, wherein in response to activating the second electronic apparatus to display the second space, the second electronic apparatus is further configured to: load a second virtual model relative to the first virtual model in the second space, wherein the second virtual model comprises the second reference point, wherein in response to a movement of the first virtual model in the first space, the first electronic apparatus is further configured to: obtain first coordinate offset information of the first virtual model and send the first coordinate offset information to the second electronic apparatus; and in response to a movement of the first virtual model in the first space, the second electronic apparatus is further configured to: present the three-dimensional movement trajectory corresponding to the second virtual model in the second space based on the first coordinate offset information, wherein in response to a movement of the second virtual model in the second space, the second electronic apparatus is further configured to: obtain second coordinate offset information of the second virtual model; and present the three-dimensional movement trajectory corresponding to the virtual model in the second space based on the second coordinate offset information.

22. The method for remote sharing annotation trajectory in a three-dimensional space according to claim 12, wherein in response to activating the second electronic apparatus to display the second space, the second electronic apparatus is further configured to: obtain the second reference point of the designated object presented in the second space based on the identifying mark; and after reconstructing the three-dimensional movement trajectory, present the three-dimensional movement trajectory corresponding to the reference point in the second space.

* * * * *